J. A. MYERS.
Improvement in Mole-Traps.

No. 130,737.

Patented Aug. 20, 1872.

WITNESSES.
Villette Anderson
E. H. Bates

INVENTOR.
John A. Myers,
Chipman Hosmer & Co
Attys

UNITED STATES PATENT OFFICE.

JOHN A. MYERS, OF LOVELY DALE, INDIANA.

IMPROVEMENT IN MOLE-TRAPS.

Specification forming part of Letters Patent No. 130,737, dated August 20, 1872.

*To all whom it may concern:*

Be it known that I, JOHN A. MYERS, of Lovely Dale, in the county of Knox and State of Indiana, have invented a new and valuable Improvement in Mole-Traps; and I do hereby declare that the following is a full, clear, and exact description of the construction and operation of the same, reference being had to the annexed drawing making a part of this specification and to the letters and figures of reference marked thereon.

Figure 1:
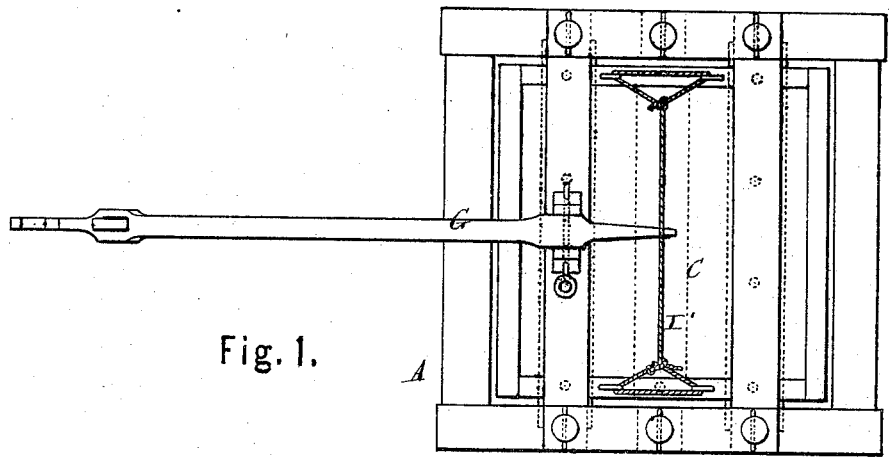
Figure 2:
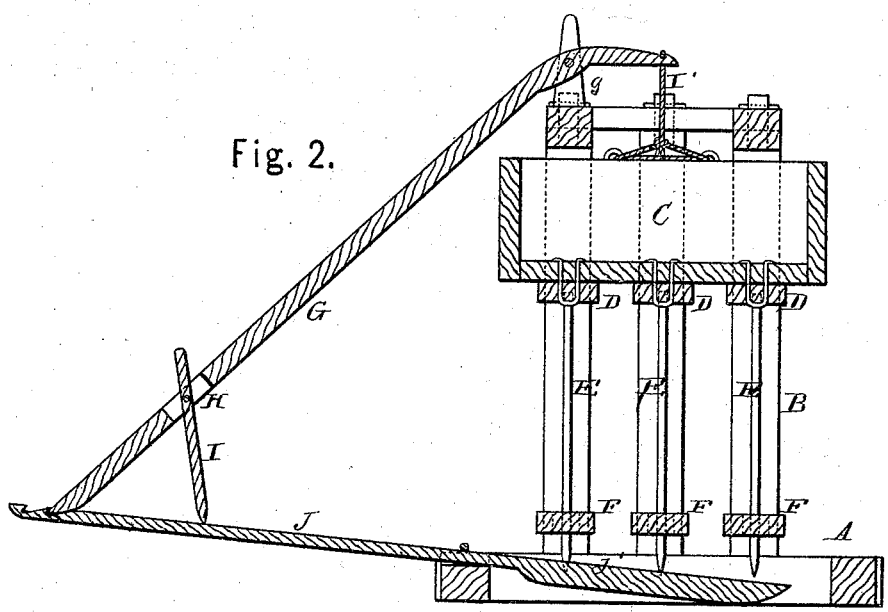

Figure 1 of the drawing is a representation of a plan view of my invention. Fig. 2 is a cross-vertical section of the same.

My invention has relation to mole-traps; and consists in the construction and novel arrangement of the frame, triggers, spears, and spear sinker and holder, all as hereinafter described.

Referring to the accompanying drawing, A designates an upright rectangular frame, having side posts B between which slides a box, C, having attached to its bottom part the cleats D, some of which are recessed at the ends to embrace the posts B, and to guide the box in its vertical movement. E designates pointed rods inserted in and depending from the cleats D. The points of these rods or spears are at their lower ends, which pass through apertures in transverse bars F of the frame A. G designates a bent lever, pivoted between standards g, beveled at its lower end and slotted at H to hold a pivoted arm, I, pointed or provided with a sharpened pin at its lower end. The box C is furnished with a bail or cord, I', which, when the box is raised, catches in a notch made at the upper end of the lever, G. J represents a trigger, having a flat, enlarged end, J', designed to be inserted in the ground wherever a mole is known to burrow. This trigger passes through a loop or aperture in the base of the frame to a point underneath the lower end of the lever G. The end of the trigger is notched to receive the beveled end of the lever when the trap is set.

In setting the trap the flattened end of the trigger is pressed into the ground at the proper place, and the trap placed in an upright position with the box C raised, the cord I' attached to the lever G, and the lever connected to the trigger. Now, when the mole begins to burrow underneath the trap it will come in contact with the end of the trigger and will trip it. By this means the box, previously weighted by being filled with clay or stones, will be made to fall, and spears to pass into the mole-hill and pierce the body of the mole.

The purpose of the arm I is to assist in separating the trigger and lever when the former is tripped. When the mole moves the flattened end of the trigger the leverage tends to raise the arm I and to elevate the lower end of the lever G.

What I claim as my invention, and desire to secure by Letters Patent, is—

The pivoted arm I, in combination with the trigger J, lever G, and box or weight C holding the spears E, substantially as set forth.

In testimony that I claim the above I have hereunto subscribed my name in the presence of two witnesses.

JOHN A. MYERS.

Witnesses:
JOHN A. BONHAM,
A. I. HARRINGTON.